United States Patent [19]
Naedler et al.

[11] Patent Number: 5,558,408
[45] Date of Patent: *Sep. 24, 1996

[54] VEHICLE BRAKE SYSTEM

[75] Inventors: Mark H. Naedler, Houston, Tex.;
Nathan L. Goldfein, Tucson, Ariz.

[73] Assignee: International Transquip Industries, Inc., Houston, Tex.

[ * ] Notice: The term of this patent shall not extend beyond the expiration date of Pat. No. 5,402,866.

[21] Appl. No.: 416,216

[22] Filed: Apr. 4, 1995

Related U.S. Application Data

[63] Continuation-in-part of Ser. No. 2,174, Jan. 8, 1993, Pat. No. 5,402,866.
[51] Int. Cl.$^6$ .................................................... F16D 69/00
[52] U.S. Cl. .................................. 303/7; 303/89; 188/67; 188/265; 92/24
[58] Field of Search .................................. 303/601, 7, 8, 303/9.61, 89; 188/265, 170, 353, 60, 68, 69, 153 R, 365, 361, 67; 92/15, 24, 27

[56] References Cited

U.S. PATENT DOCUMENTS 5,190,357  3/1993  Goldfein ...................................... 303/7

FOREIGN PATENT DOCUMENTS 2034429  10/1979  United Kingdom .

Primary Examiner—Robert Oberleitner
Assistant Examiner—Peter M. Poon
Attorney, Agent, or Firm—Vaden, Eickenroht & Thompson, L.L.P.

[57] ABSTRACT

Disclosed is an air-applied, mechanically-held brake assembly and a vehicle air brake system employing the same. The air brake system typically includes a push-pull or handbrake valve for park and emergency applications, a treadle valve for service applications, reservoirs of air under pressure, and other valving and plumbing. The brake assembly applies and releases the brake upon the supply and exhaust, respectively, of air from a first pressure chamber. The brake assembly locks and unlocks the brake in an applied position by the exhaust and supply, respectively, of air from a second pressure chamber. The locking mechanism of the brake assembly is designed to compound the force of the fluid pressure in the first pressure chamber with the force of the fluid pressure supplied to the second pressure chamber when unlocking the brake to compensate for back pressure.

26 Claims, 8 Drawing Sheets

VEHICLE BRAKE SYSTEM

BACKGROUND OF THE INVENTION

This is a continuation-in-part application of our U.S. patent application Ser. No. 08/002,174, filed Jan. 8, 1993, issued Apr. 4, 1995, as U.S. Pat. No. 5,402,866, from which we claim the earlier effective filing date for all common disclosure.

1. Field of the Invention

This invention pertains generally to brake systems for heavy duty vehicles. More particularly, this invention pertains to an improved vehicle air brake system including a fluid-applied, mechanically-held brake assembly.

2. Description of the Prior Art

Heavy duty vehicles such as tractors, trailers, and tractor-trailer combinations generally employ braking systems which operate on pressurized air. The vehicle brakes in such systems are controlled by the operation of brake assemblies which operate in response to the supply and exhaust of air under pressure received to and from the rest of the system. The industry is heavily regulated by the national governments of most developed countries and, as a consequence of these regulations, two types of brake assemblies have evolved. These two types are called "spring brakes" and "air-applied, mechanically-held brakes".

Spring brakes are so-called because they are activated for parking and emergency applications by large springs in the brake assembly. In a braking system employing spring brake assemblies, the brakes are applied and released for service applications by the supply and exhaust of air, respectively, to and from a first pressure chamber (usually called the "service chamber") of the brake assembly. The diaphragm of the first pressure chamber operates against a push plate to overcome the force of a return spring and apply the brake when air is supplied to the first pressure chamber. When air is exhausted, the spring returns the push plate to its original position thereby releasing the brake.

The brake of a spring brake assembly is applied and released for parking and emergency applications by the exhaust and supply, respectively, of air under pressure from and to a second pressure chamber of the brake assembly (usually called the "park chamber"). Thus, the exhaust of air releases a large spring to operate against a push plate to apply the brake. The brake is released by the supply of air under pressure to the same diaphragm, which operates against the push plate to overcome the force of the spring to release the brake.

The large springs in spring brake assemblies create several practical problems for the industry. The springs are typically heavy and bulky, and so spring brake assemblies are correspondingly heavy and bulky. These undesirable characteristics detract from the overall performance of the brake assembly and hence the entire brake system. This is especially true for the brake systems requiring relatively large numbers of brake assemblies to comply with governmental regulations for heavy duty vehicles. Spring brakes are also subject to weakened stroke, dragging and broken springs. Furthermore, spring brakes can be dangerous to maintain because of the large spring force, a problem which persists even when the assembly is properly disposed of, and in operation because they can be partially applied without the operator's knowledge. Newly manufactured spring brake assemblies pose additional problems because they are sealed when manufactured, thereby preventing, or at least seriously complicating, maintenance of the brake assembly.

Air-applied, mechanically-held brake assemblies overcome the above problems presented by spring brake assemblies. An air-applied, mechanically-held brake assembly applies and releases the brake in response to the supply and exhaust of air, respectively, to and from a pressure chamber much in the manner of the service chamber a spring brake assembly. Typically, a diaphragm operates against a push plate upon the supply of air under pressure to overcome the force of the return spring to apply the brake, and, upon the exhaust of the air under pressure, the spring operates to return the push plate to its original position to release the brake. However, the brake is locked in an applied position by some mechanical means in response to the supply and exhaust of air. The mechanical means may vary depending upon the particular design of the brake assembly but all such mechanical means generally have the advantage of overcoming the problems associated with spring brake assemblies.

Such air-applied, mechanically-held brake assemblies are disclosed, along with an accompanying air brake systems, in the United States Letters Patent Re. 29,913 issued Feb. 20, 1979 to Case et al., in U.S. Pat. No. 4,685,744 issued Aug. 11, 1987 to Ronald W. Luce. In the latter, air is supplied to and exhausted from the first pressure chamber of the brake assembly via a two-way check valve. Once pressure is supplied to the pressure chamber and the diaphragm operates against the push plate to overcome the force of the return spring to apply the brake, air is exhausted from a piston in the brake assembly which has a pawl on the end of it. The piston drops when the air pressure is exhausted therefrom to permit the pawl to be spring pressed into engagement with a rack on the push rod attached to the push plate, thereby locking the brake in an applied position. The brake can be unlocked by supplying air under pressure to the piston to raise the piston and disengage the pawl on the end of the piston from locking engagement with the rack on the push rod. The brakes are thereby "mechanically held" by the rack and pawl engagement of the push rod and piston.

Another air-applied, mechanically-held brake assembly is disclosed in United States Statutory Invention Registration H748 obtained by John M. Graham and published Mar. 6, 1990. Graham employs a collet operating on the outside of the push rod driven by a diaphragm in response to the supply and exhaust of air under pressure to lock the brake in an applied position. In theory, the collet is driven into a tapered hole by the force of a spring when pressure is exhausted from the diaphragm, thereby clamping the push rod and preventing further movement. The brakes are consequently "mechanically held" in an applied position by the collet. However, as will be subsequently discussed, the design disclosed in Graham suffers from several fundamental flaws.

A third air-applied, mechanically-held brake assembly is the DD-3 brake assembly manufactured and sold by the Heavy Vehicle Systems Group of Bendix. The DD-3 has a diaphragm which overcomes the force of a return spring on the supply of air under pressure. When air is exhausted from a piston operating the locking mechanism, the biasing force of a spring drives a plurality of rollers against an inclined surface that forces the rollers against the outside of the push rod to bind further movement. The push rod is thereby "mechanically held" by the binding force generated by the interaction of the rollers and the inclined surface.

One problem common to these and other mechanically-held brake assemblies not present in spring brake assemblies is back pressure on the push rod resulting from the cooling of heated brake drums. The drums of a vehicle's brakes become heated and expand during periods of intense or prolonged use. If the brakes are locked in an applied position while the brake drums are heated and are left locked for a period of time, the brake drums will cool and contract, thereby generating a back pressure on the push rod. The back pressure effectively magnifies the holding force locking the brakes, and creates severe problems unless adequately dealt with.

The control valve disclosed and claimed in U.S. Pat. No. 4,907,814 issued to International Transquip Industries, Inc. as the assignee of the inventor Nathan L. Goldfein on Mar. 13, 1990 addressed the back pressure problems facing the Case et al. and Luce brake assemblies. Although the brake assemblies work well in air brake systems with conventional control valves, the Goldfein control valve increases performance by manipulating pressures within the air brake system so that air at the peak pressure found on the diaphragm is used to allow the piston to raise and unlock the brakes. A greater force is therefore available to unlock the brakes than is found in the combined braking force exerted in applying the brake and the back pressure created by contracting brake drums.

The Graham brake assembly disclosed in Statutory Invention Registration H748 was apparently inspired by the need to effectively cope with additional forces generated by back pressure. The specification accompanying the Statutory Invention Registration H748 indicates that Graham intended that the locking means be axially movable in the brake "off" position in response to the presence of back pressure. However, among other things, the collet diaphragm is pierced through in several places in a manner which may prevent maintaining a seal at the necessary operating pressures.

It is therefore an object of this invention to satisfy both the technical and economical considerations in a manner which complies with governmental regulations and operate with currently used and installed air brake systems.

It is also an object of this invention to provide an operable fluid-applied, mechanically-held brake assembly for use with heavy vehicles which adequately deals with back pressure on the push rod.

It is furthermore an object of this invention to provide such a fluid-applied, mechanically-held brake assembly which is usable in brake systems employing conventional valving.

SUMMARY OF THE INVENTION

These and other objects are accomplished, in accordance with the illustrated embodiments of this invention, by which a brake system for a vehicle comprises a fluid-applied, mechanically held brake assembly including a housing; a hollow first rod connectable to a brake; a first pressure-responsive member within the first housing fixed to the first rod to move the first rod in a first direction to apply the brake responsive to the supply of fluid pressure thereto; and first means biasing the first rod in the opposite direction to release the brake responsive to the exhaust of fluid pressure from the first pressure-responsive member. A second rod is fixed to the housing concentrically to the first rod and a third rod within the housing is arranged concentrically with respect to the first and second rods for reciprocation with respect thereto, together with a second pressure-responsive member within the housing and arranged to move the third rod in the first direction responsive to the supply of fluid pressure to the second chamber, and second means biasing the third rod in the opposite direction responsive to the exhaust of fluid pressure from the second pressure-responsive member. The assembly further includes means for locking the first rod to the second rod when the first rod has been moved in the first direction and the third rod is moved in the opposite direction and for unlocking the first rod from the second rod when the third rod is moved in the first direction, means in the housing through which fluid under pressure may be supplied to the first pressure-responsive member to move the first rod in the one direction to apply the brake and exhausted from the first pressure-responsive member to permit the first rod to be moved by the first biasing means in the opposite direction to release the brake; and means through which fluid under pressure may be exhausted from the second pressure-responsive member to permit the second biasing means to move the third rod in the opposite direction to lock the brake and, in the preferred and illustrated embodiment, supplied to the second pressure-responsive member to compound the force of fluid under pressure in the first pressure-responsive member and overcome the second biasing means in order to move the third rod in the one direction to unlock the brake.

The system further includes a source of fluid under pressure for supplying fluid under pressure to the first and second pressure-responsive members; a first means actuatable to generate and transmit a park signal controlling the delivery and exhaust of fluid under pressure to and from the second pressure responsive member; and a second means actuatable to generate and transmit a service signal controlling the delivery and exhaust of fluid under pressure to and from the first pressure responsive member. In the preferred and illustrated embodiment of the invention, the first and second actuatable means are actuatable upon the supply of fluid under pressure from the source and the park and service signals are fluid under pressure.

In one embodiment of the invention, the first actuatable means is a push-pull valve and the system further includes valving means for delivering and exhausting fluid under pressure upon the exhaust and delivery, respectively, of fluid under pressure by the first actuatable means with the fluid under pressure being delivered to and exhausted from the second responsive member is delivered from and exhausted by the valving means. In another embodiment, the first actuatable means is a hand-brake valve and the second actuatable means is a treadle valve with the first rod extending through the first end wall and the first pressure-responsive member affixed to the first rod to define the first pressure-responsive member in conjunction with the first and interior walls; and the second rod mounted to the interior wall and the second pressure-responsive member operating within the second compartment to define the second pressure-responsive member in conjunction with the second and interior walls. Preferably, the locking means comprises expander means on the second rod; and wedging means carried by the third rod for disposal about the expander means so as to be expanded into locking engagement with the hollow first rod as the third rod moves in the opposite direction.

As described below, the structural relationship between the first and second pressure-responsive members and their operation in the preferred and illustrated embodiment results in the force of the fluid pressure against the pressure-responsive member compounding the force of the fluid pressure against the second pressure-responsive member when unlocking the brake to compensate for back pressure.

BRIEF DESCRIPTION OF THE DRAWINGS

A more particular description of the invention briefly summarized above can be had by reference to the preferred embodiment illustrated in the drawings of this specification so that in the manner in which the above cited objects, as well as others which will become apparent, are obtained and can be understood in detail. The drawings illustrate only preferred embodiments of the invention and are not to be considered limiting of its scope as the invention will admit to other equally effective embodiments. In the drawings.

DESCRIPTION OF THE PREFERRED EMBODIMENTS

Figure 1:
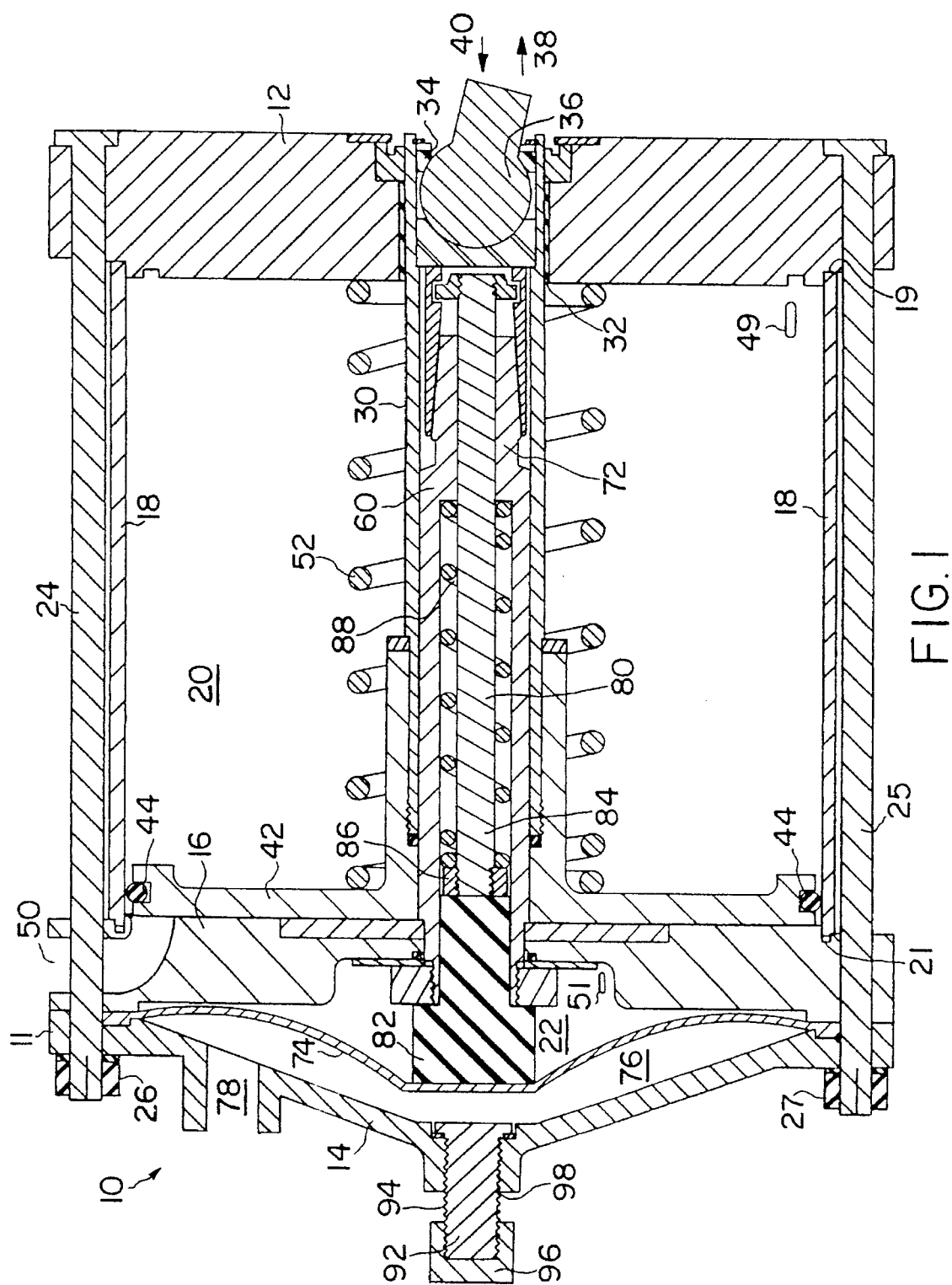
FIG. 1 is a longitudinal sectional view of the brake assembly of the present invention when the brakes are unlocked and released.

Housing 11 of the brake assembly of the present invention, generally denoted 10 in FIG. 1, is comprised of first end wall 12, second end wall 14, interior wall 16 intermediate first end wall 12 and second end wall 14, and cylindrical outer wall 18 extending between first end wall 12 and interior wall 16. Walls 12, 16, and 18 define first compartment 20 and second compartment 22 within housing 11 of brake assembly 10. Walls 12, 14, and 16 of housing 11 are joined by tie rods 24–25 and nuts 26–27, respectively, side wall 18 being held in place between first end wall 12 and interior wall 16 by placement of its ends in grooves 19 and 21 in first end wall 12 and interior wall 16 before first end wall 12, second end wall 14 and interior wall 16 are joined together by tie rods 24–25 and nuts 26–27. Alternatively, one or more of walls 12, 14, and 16 may be cast as a single piece, so that tie rods 24–25 and nuts 26–27 may be eliminated from housing 11 in some embodiments.

Hollow push rod 30 extends from within first compartment 20 through first end wall 12 for reciprocation within sealed opening 32. The end of push rod 30 extending beyond first end wall 12 encases bushing 34 having ball joint 36 connecting push rod 30, and hence brake assembly 10, to the brake (not shown). Push rod 30, when moved in a first direction defined by arrow 38, causes the brake to be applied and, when moved in a second direction defined by arrow 40 opposite the first direction 38, causes the brake to be released. The brake is thus applied and released as push rod 30 reciprocates.

Figure 2:
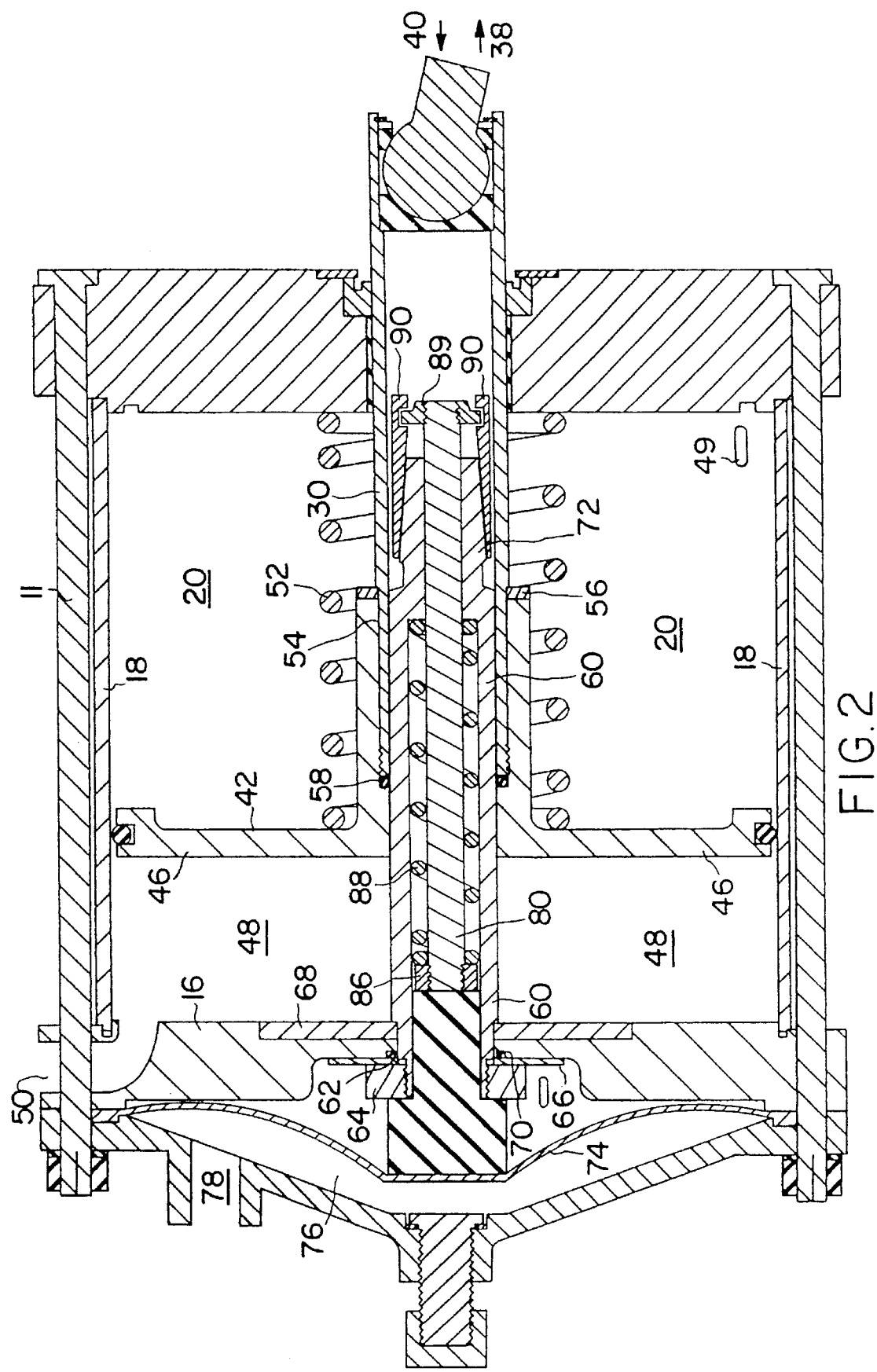
FIG. 2 is a longitudinal sectional illustration of the brake assembly in FIG. 1 when the brakes are applied but unlocked.

First pressure-responsive member 42 sealably reciprocates within first compartment 20 and in the preferred embodiment is a piston sealed by O-ring 44. As best shown in FIG. 2, side 46 of first pressure responsive member 42 in conjunction with side wall 18 and interior wall 16 forms first pressure chamber 48 within first compartment 20 of housing 11. First pressure-responsive member 42 moves in first direction 38 upon the supply of air under pressure to first pressure chamber 48 via port 50. Port 50 in the preferred embodiment connects with a two-way shuttle valve such as is disclosed in the Luce '744 patent permitting air flow through one of two ports in which the pressure of the air is greatest, although this is not necessary to the practice of the invention. First pressure responsive member 42 moves in second direction 40 upon the exhaust of air under pressure from first pressure chamber 48 through port 50 in response to the force of return spring 52. First pressure-responsive member 42 is therefore biased in second direction 40 and reciprocates in response to the supply and exhaust of air under pressure to and from first pressure chamber 48.

Push rod 30 in the preferred embodiment is threadably connected to first pressure responsive member 42 after being pressure fitted into shouldered passageway 54, washer 56 helping to distribute load transmitted via push rod 30 and O-ring 58 maintaining the seal for first pressure chamber 48 to prevent loss of pressure therefrom. The ullage of compartment 20 is vented to atmosphere via port 49. Push rod 30 consequently reciprocates in response to the movement of first pressure-responsive member 42, which in turn reciprocates in response to the supply and exhaust of air to and from first pressure chamber 48, thereby applying and releasing the brakes in response to the supply and exhaust of air under pressure to and from first pressure chamber 48.

Second rod 60 is mounted to interior wall 16 of housing 11 and extends into the hollow first rod 30. Second rod 60 is threaded on one end and is inserted through opening 62 and interior wall 16 where it is secured by nut 64. Washers 66 and 68 distribute force transmitted by second rod 60 over a relatively larger surface area to reduce the level of stress on interior wall 16 in the vicinity of opening 62. O-ring 70 provides a seal which maintains the integrity of first pressure chamber 48. Second rod 60 has expander means 72 at its other end which in the preferred embodiment is frustoconically shaped and is located intermediate the ends of first rod 30 so that it extends at least partially into hollow first rod 30 at all times in the preferred embodiment and provides the means about which first pressure member 42 sealably reciprocates in response to pressure supplied to and exhausted from first pressure chamber 48. Second rod 60 thereby provides a bearing surface for first rod 30 within housing 11, thereby allowing the overall length of brake assembly 10 to be shortened by the length of the stroke and the bearing surface.

Returning to FIG. 1, second pressure responsive member 74 operates in second compartment 22 and, in conjunction with second end wall 14 creates second pressure chamber 76 within second compartment 22. Second pressure responsive member 74 in the preferred embodiment is a diaphragm clamped in a manner well known in the art between interior wall 16 and second end wall 14, but may alternatively be a piston sealed by an O-ring that sealably reciprocates in second compartment 22. Port 78 provides a means through which air under pressure may be supplied to and exhausted from second pressure chamber 76. The ullage of second compartment 22 is vented to atmosphere via port 51. Although third rod 80 may be constructed as a single piece, third rod 80 in the preferred embodiment is comprised of first rod member 82 and second rod member 84 and reciprocates within hollow second rod 60 as discussed below in response to the operation of second pressure responsive member 74.

In the preferred embodiment, spring 88 is compressed between the internal shoulder on rod 16 and nut 86 threadably engaged to one end of third rod 80 to bias third rod 80 in second direction 40. First rod member 82 is not affixed to second rod member 84 but is at all times adjacent thereto through the operation of spring 88 and second pressure responsive member 74 since spring 88 biases second rod member in second direction 40 and second pressure responsive member 74 biases first rod member 82 in first direction 38. The only time first rod member 82 does not abut second rod member 84 is when air under pressure is first applied to second pressure chamber 76 and acceleration overcomes the spring bias as described immediately below.

When air under pressure is applied to second pressure responsive member 74, second pressure responsive member 74 operates against first rod member 82 to force first rod member 82 in first direction 38 until first rod member 82 is stopped by nut 64. Since first rod member 82 is not affixed to second rod member 84, second rod member 84 may continue to move in first direction 38 until the residual force is absorbed by spring 88 and spring 88 returns second rod member 84 to a position abutting first rod member 82. Thus, in addition to biasing third rod 80 in second direction 40, spring 88 also serves as a shock absorber to reduce wear and tear on brake assembly 10 components.

Figure 6:
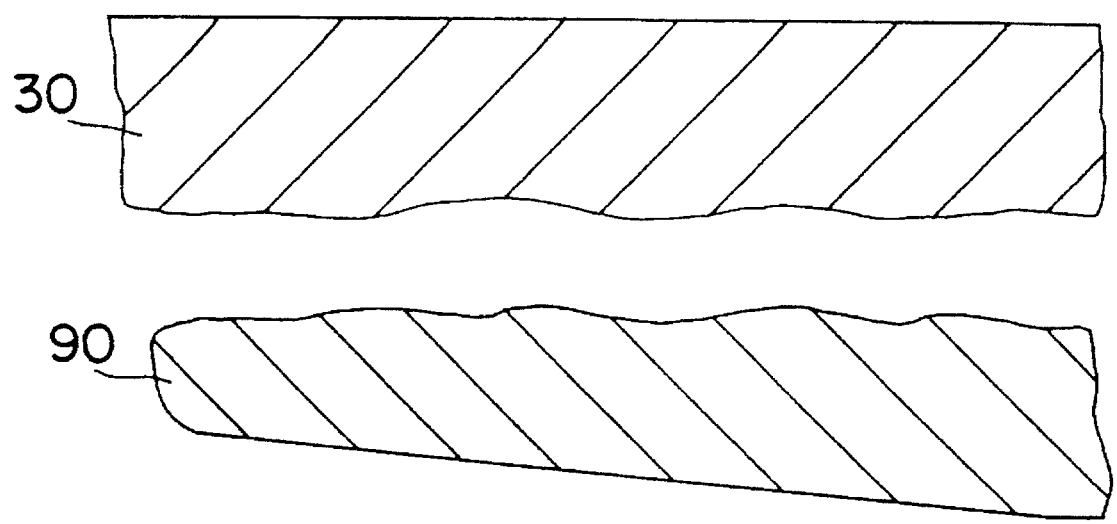
FIG. 6 is a cross-sectional illustration of the surfaces of the locking means in the brake assembly of the invention.

The end of second rod member 84 not abutting first rod member 82 is threadably engaged with nut 89 to which plurality of slips 90 are loosely mounted as shown in FIG. 2. Each of slips 90 wedges between expander means 72 and the interior wall of first rod 30 at an angle of approximately 5° relative to axis of second rod member 84. The surface of each of slips 90 engaging the interior wall of first rod 30 is textured (as shown in FIG. 6) and expander means 72 is coated with a silicon-based lubricant. The interior wall of first rod 30 may also be textured in some embodiments as is shown in FIG. 6. Slips 90 thereby create a wedging means which is positioned by third rod 80 about expander means 72 of second rod 60 such that the wedging means is expanded into locking engagement with the interior wall of first rod 30 when third rod 80 moves in second direction 40. Conversely, when third rod 80 moves in first direction 38 in response to the operation of second pressure responsive member 74, the locking engagement between plurality of slips 90 and the interior wall of the hollow of first pipe 30 is broken to unlock the brakes.

The preferred embodiment includes caging nut 92 comprised of threaded member 94 and nut cap 96. Threaded member 94 is threadably engaged with opening 98 in second end wall 14 and to nut cap 96 such that caging nut 92 can be extended into second pressure chamber 76 by rotating nut cap 96 and hence threaded member 94. Caging nut 92 is consequently used in a manner known to the industry to provide a manual mechanism for unlocking the brake.

FIG. 1 illustrates the relative positions of the components of brake assembly 10 when the brake is released and unlocked. Air under pressure has been exhausted through port 50 from first pressure chamber 48 (shown in FIG. 2), causing first pressure responsive member to move the maximum distance possible in direction 40. Air under pressure has been supplied to second pressure chamber 76 such that second pressure responsive member 74 operates against third rod 80 to overcome the force of spring 88 and move third rod 80 the maximum distance possible in direction 38.

FIG. 2 illustrates the relative positions of the components when the brake is applied, but unlocked. The brake is applied by supplying air under pressure to first pressure chamber 48 via port 50. When there is sufficient pressure in pressure chamber 48 to overcome the force of return spring 52, first pressure responsive member 42 moves in direction 38 thereby applying the brake. The force with which the brake is applied can be increased by increasing the distance which first pressure responsive member 42 and first rod 30 travel in direction 38, and in the preferred embodiment this distance is three (3) inches. Thus, the preferred embodiment of the claimed invention provides a three (3) inch stroke from an air-applied, mechanically-held brake assembly.

Figure 3:
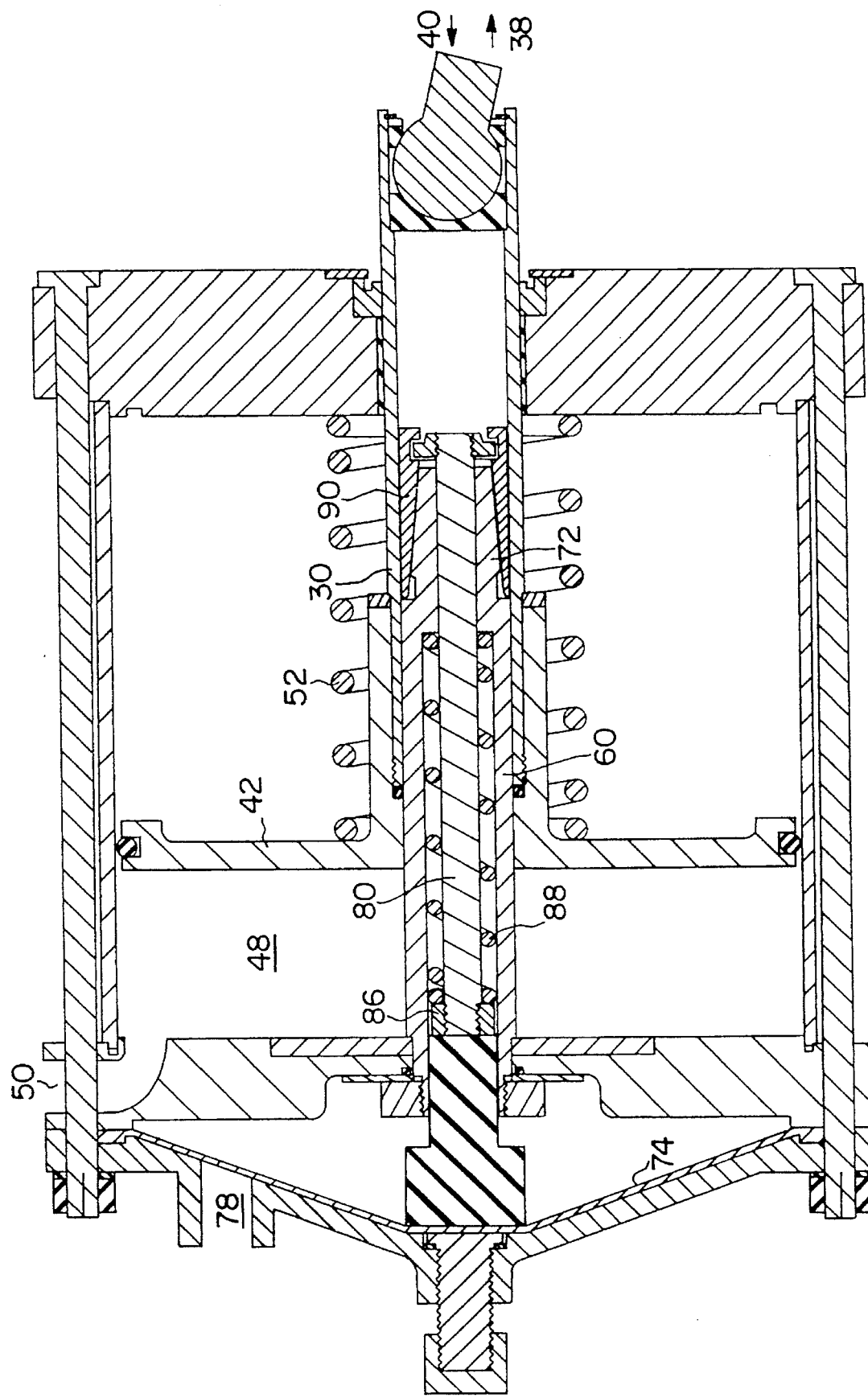
FIG. 3 is a longitudinal sectional view of the brake assembly of FIG. 1 when the brakes are applied and locked.

FIG. 3 shows the relative positions of the component when the brake is applied and locked. The brake is locked by exhausting air under pressure from second pressure chamber 76 (better shown in FIG. 2) via port 78. As second pressure responsive member 74 responds to the exhaust of fluid pressure in second pressure chamber 76 (shown in FIG. 2), spring 88 operates against a shoulder formed by nut 86 and pushes third rod 80 in second direction 40. As third rod 80 moves in second direction 40, slips 90 are forced outward by expander means 72 of second rod 60 into locking engagement with the interior wall of first rod 30.

The brake can be unlocked from the configuration shown in FIG. 3 to return to the configuration of FIG. 2 by the application of air under pressure to second pressure chamber 76 via port 78. This will cause second pressure responsive member 74 to operate against third rod 80 to move third rod 80 in first direction 38, thereby moving slips 90 off expander means 72 to collapse inwardly and break the locking engagement. This force exerted by the air under pressure in chamber 76 is simultaneously compounded by the force on hollow rod 30 exerted by air under pressure in first pressure chamber 48 to allow brake assembly 10 to oppose any additional locking force generated by back pressure, as previously described.

Once the brake is unlocked and the components of brake assembly 10 return to their relative positions as shown in FIG. 2, the brake can be released and the components returned to their relative position shown in FIG. 1 by exhausting air under pressure from chamber 48, thereby allowing first pressure responsive member 42 to move in second direction 40 in response to the force of return spring 52. As first pressure responsive member moves in direction of second direction 40, so does first rod 30 thereby releasing the brake. Thus, the cycle of applying, locking, unlocking, and releasing the brake using brake assembly 10 is performed by (a) supplying air under pressure to first pressure chamber 48, (b) exhausting air under pressure from second pressure chamber 76, (c) supplying air under pressure to second pressure chamber 76, and (d) exhausting air under pressure from first pressure chamber 48.

Figure 4:
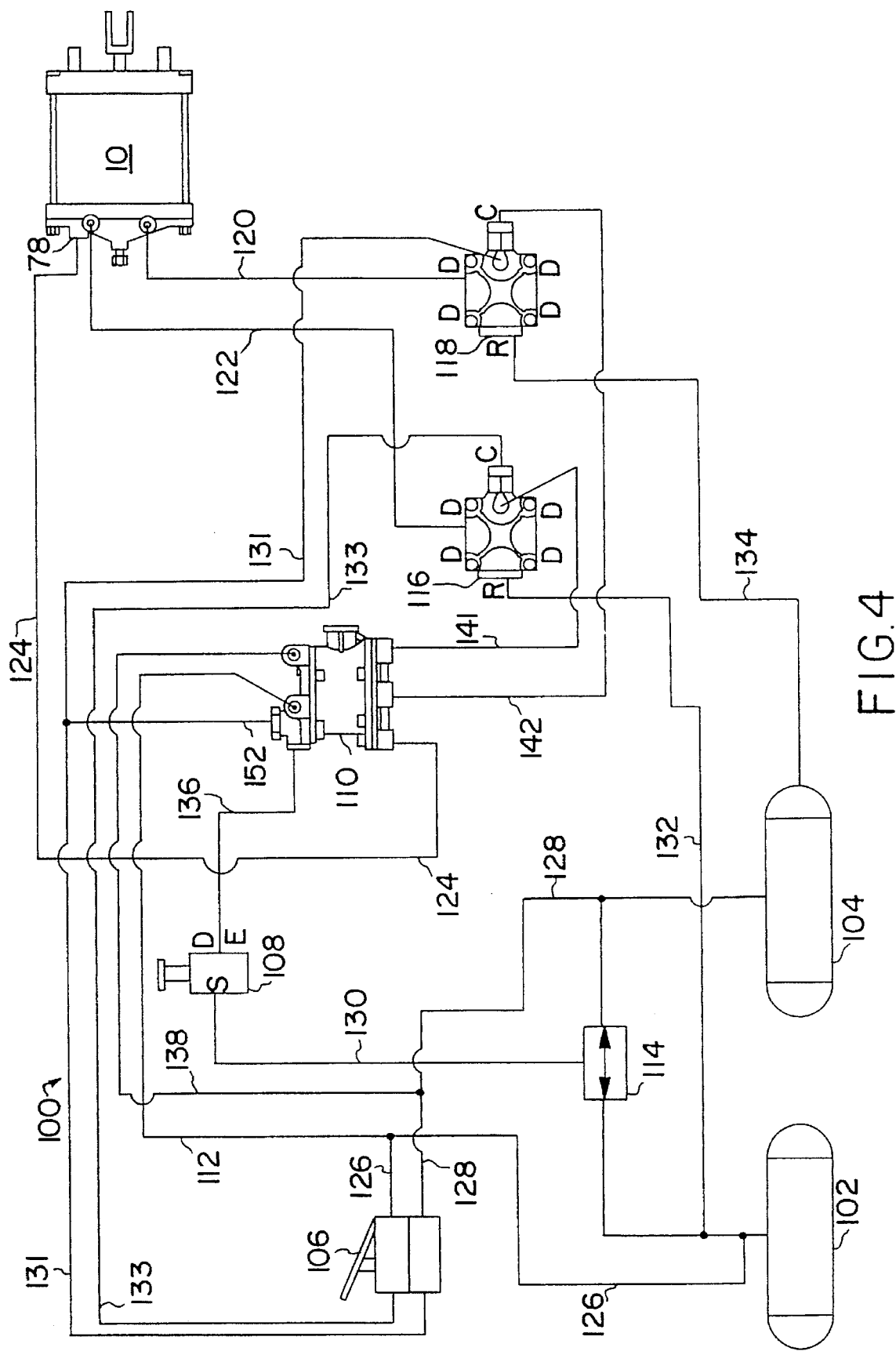
FIG. 4 is a schematic diagram of an air brake system employing conventional valving and the brake assembly of the invention in a powered vehicle.

Air brake system 100 for a powered vehicle shown in FIG. 4 is a preferred embodiment for dual tank system incorporating primary tank 102 and secondary tank 104 which are sequentially filled in a manner well known to those skilled in the art with the use of equipment not shown. Treadle valve 106 controls service applications of the brakes of brake system 100 by supplying air under pressure from primary tank 102 and secondary tank 104 when actuated by depressing the treadle and exhausting air under pressure from downstream lines when deactuated by releasing the treadle. Push-pull valve 108 controls parking application of the brakes by exhausting air in downstream lines when pulled to actuate and by supplying air from primary tank 102 and secondary tank 104 when pushed to deactuate.

Valve 110 in the preferred embodiment is including the Goldfein control valve disclosed and claimed in the '814 patent as described above. A TR3 control valve manufactured by the Heavy Vehicle Systems Group of Bendix or any inversion control valve may also be used in other embodiments. The Goldfein control valve is preferred because of the added ability to provide air at peak pressure to unlock the brake assembly, but this feature is not necessary for the practice of the invention. However, it is to be understood that valve 110 need not necessarily be an inversion valve or a "control" valve in all embodiments of the invention. Relay valves 116 and 118 in the preferred embodiment may be R12 or R14 relay valves again manufactured by the Heavy Vehicles Systems Group of Bendix. Similarly to valve 110, relay valves 116 and 118 need not necessarily be R12 or R14 relay valves in all embodiments. Two-way check valve 114 may be any one of several well known to those in the art.

In its preferred embodiment, system 100 includes a plurality of brake assemblies 10 although only one brake assembly 10 is shown in FIG. 4 for the sake of clarity. The exact number of brake assemblies is determined by the individual vehicle on which system 100 is installed in a manner well known to those in the art. The adaptations to FIG. 4 necessary to realize these embodiments of the invention will be obvious to one of ordinary skill in the art having the benefit of the teachings herein. Similarly, only one of reservoirs 102 and 104 is necessary for the practice of the invention but governmental regulations generally require at least two and sometimes three such reservoirs for redundancy in the event of failure.

First pressure chamber 48 (shown in FIG. 2) receives air under pressure from lines 120 and 122 which feed air under pressure into the two-way shuttle valve (not shown) and through outlet port 50 of the two-way shuttle valve. Air under pressure is exhausted from first pressure chamber 48 through the same path. Air under pressure is supplied to and exhausted from second pressure chamber 76 (shown in FIG. 1) of brake assembly 10 via port 78 and line 124. The supply and exhaust of air under pressure through lines 120, 122, and 124 thereby controls the operation of the brake of brake assembly 10 in the manner described above.

The operation of system 100 for service and park applications in the preferred embodiment is generally controlled by the operator of the vehicle using treadle valve 106 and push-pull valve 108. Both treadle valve 106 and push-pull valve 108 are actuatable upon the supply of air under pressure from tanks 102 and 104. Treadle valve 106 receives air under pressure from tank 102 via line 126 and from tank 104 via line 128. Push-pull valve 108 receives air under pressure from both 102 and 104 via line 130 and two-way check valve 114, two-way check valve 114 receiving air under pressure from both of tanks 102 and 104 and continuously supplying air under pressure to push-pull valve 108 as long as either one of reservoirs 102 and 104 maintain integrity and air under pressure. Tanks 102 and 104 together therefore comprise a source of air under pressure for system 100. Some embodiments of system 100 will include a compressor and wet tank which may also in those embodiments be considered a part of the source providing air under pressure.

Service applications are initiated when the operator of system 100 depresses the treadle of treadle valve 106. Treadle valve 106 is thereby actuated to transmit a service signal (i.e., air under pressure received via lines 126 and 128) via lines 131 and 133 to the control ports of relay valves 116 and 118, respectively. Relay valves 116 and 118 are supplied with air under pressure from tank 102 via line 132 and from tank 104 via line 134, respectively. Each of relay valves 116 and 118 delivers air under pressure supplied to them from the source to brake assembly 10 via lines 120 and 122 on receipt of the service signal of the control port via lines 131 and 133. Brake assembly 10 then applies the brake upon the receipt of air via either one of lines 120 and 122 as discussed above in connection with FIGS. 1–3.

Park applications are initiated by the operator of the vehicle pulling push-pull valve 108, which generates the park signal by exhausting line 136 whereupon valve 110 exhausts line 124. Since the parking application requires brake 10 be locked in an applied position, a service signal must also be generated. Such a service signal can be generated by actuating treadle valve 106 at the same time push-pull valve 108 is actuated. However, the preferred embodiment employs valve 110.

Valve 110 is supplied with air under pressure delivered from the source via lines 112 and 138. Valve 110 then generates a service signal transmitted via lines 141–142 to relay valves 116 and 118 upon the exhaust of air under pressure in line 136 and the supply of air under pressure delivered from the source via line 138. The brake of brake assembly 10 is then applied as set forth above. The brake of brake assembly 10 is then locked in an applied position since push-pull valve 108 exhausts line 36 when actuated, thereby causing valve 110 to exhaust line 124.

The brake is then unlocked by the deactuating push-pull valve 108 to restore pressure to line 136, causing valve 110 to restore pressure to line 124. The force exerted by the air received via line 124 then compounds the force exerted by the air being received via lines 120 and 122 to assist in unlocking the brake. Valve 110 exhausts lines 141–142 upon the restoration of pressure in line 136 thereby terminating the service signal. Relay valves 116 and 118 then exhaust lines 120 and 122 to release the brake. In the event the brake is applied as a result of a service application, the operator deactuates treadle valve 106 thereby exhausting pressure from lines 131 and 132, which in turn causes relay valves 116 and 118 to exhaust lines 120 and 122 to release the brake.

Figure 5:
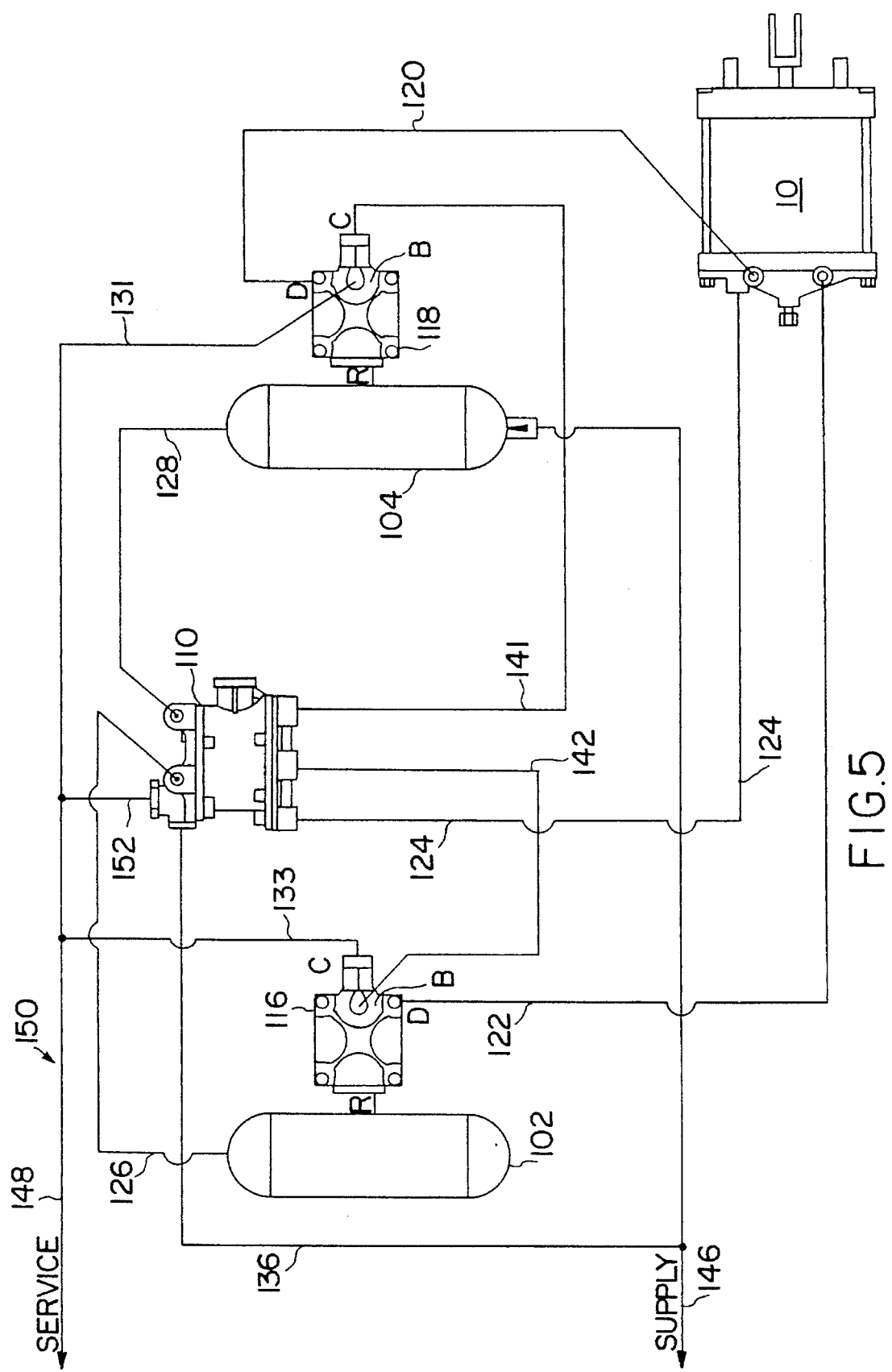
FIG. 5 is a schematic diagram of an air brake system employing conventional valving and the brake assembly of the invention in a towed vehicle.

System 150 in FIG. 5 is one adaptation of system 100 in FIG. 4 and is intended for use on towed vehicles such as trailers. System 150 is very similar to system 100 in both structure and operation, with like parts having like numbers. Again, only one brake assembly 10 is shown for the sake of clarity. Such major differences as may exist between system 100 and system 150 will be readily understood and appreciated by those in the art as those that typically result from application to towed vehicles rather than powered vehicles. For instance, lines 146 and 148 are commonly denominated "supply" and "service" lines, respectively, and are used for supplying air under pressure and for transmitting park signals and transmitting service signals, respectively, from the powered vehicles to system 150. Also, treadle valve 106 and push pull valve 108 in system 100 have no counterpart in system 150 since they are only found on powered vehicles.

Figure 7:
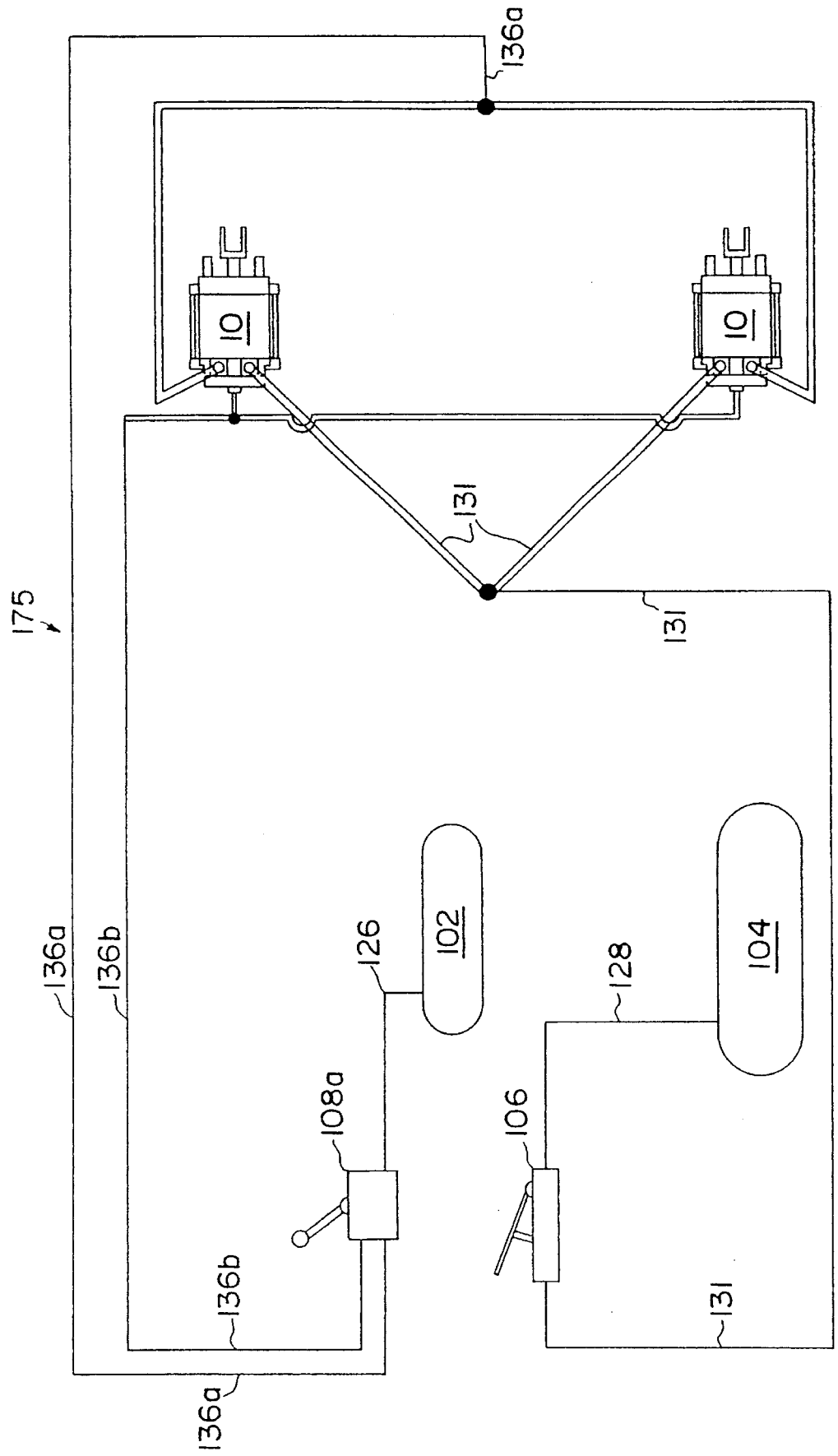
FIG. 7 is a schematic diagram of an alternative air brake system employing conventional valving and the brake assembly of the invention in a powered vehicle.
Figure 8:
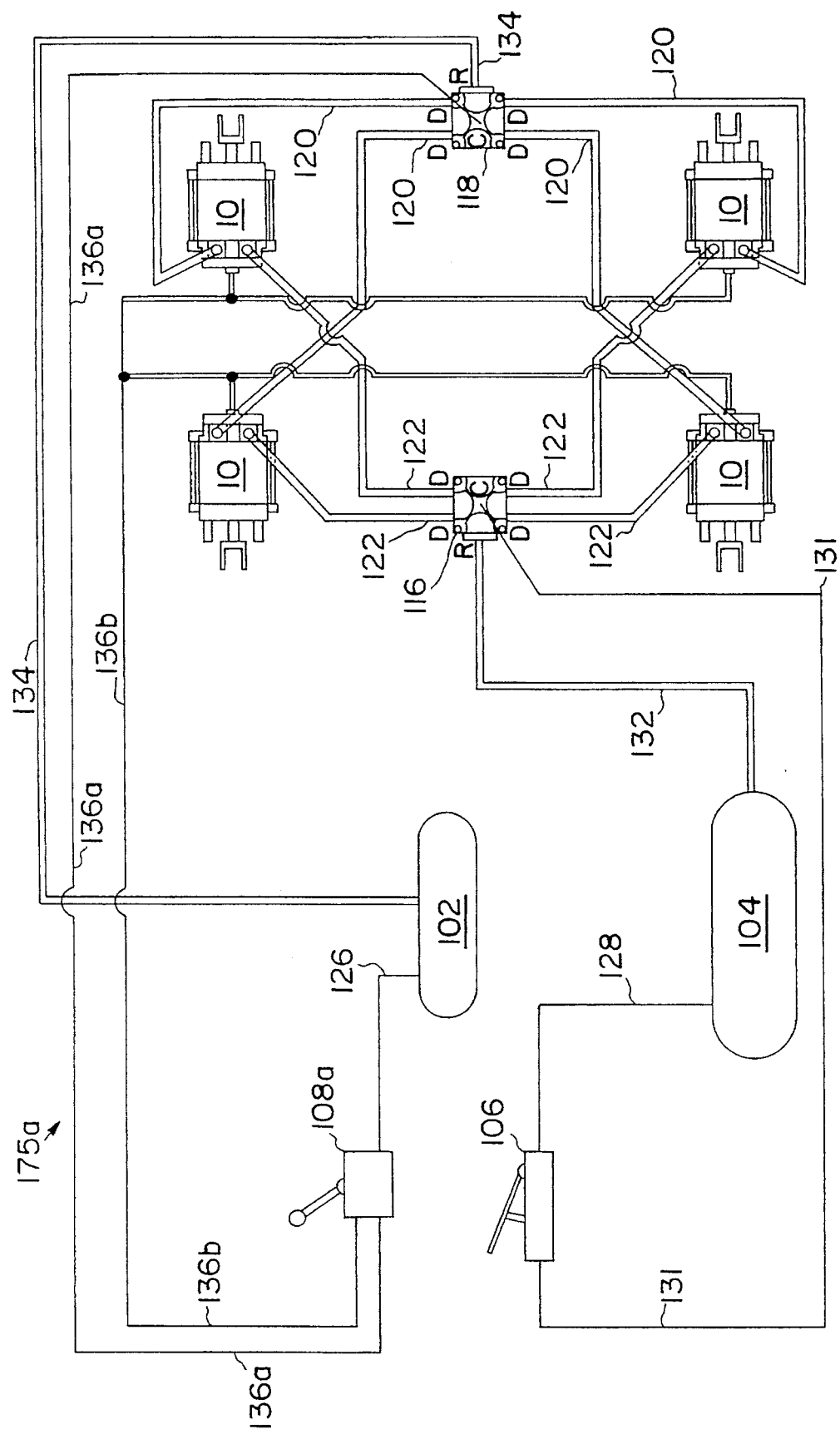
FIG. 8 is a schematic diagram of an alternative air brake system adapted from that of FIG. 7.

Air brake system 175 in FIG. 7 is an alternative to system 100 in FIG. 4 and system 150 in FIG. 5, with like parts bearing like numbers. System 175, like system 100, is principally designed for use in a powered vehicle and can readily be adapted for use with towed vehicles. System 175 furthermore includes two brake assemblies 10 whose construction and operation are discussed above in connection with FIGS. 1–3 and 6 and system 175 can easily be adapted for use with four or more such assemblies as illustrated in FIG. 8. Returning to FIG. 7, treadle valve 106, park tank 102 and service tank 104 all perform as their counterparts in system 100 of FIG. 4.

One difference between system 175 and system 100 of FIGS. 4 is the replacement of push-pull valve 108 with hand-brake valve 108*a*. Push-pull valve 108 either fully pressurizes or fully exhausts line 136 in system 100 in FIGS. 4 whereas hand-brake valve 108*a* can gradually pressurize and exhaust lines 136*a–b* of FIG. 7 from full exhaust to full pressure. Hand-brake valve 108*a* therefore allows the vehicle operator greater control over braking applications than does push-pull valve 108.

Hand-brake valve 108*a* performs the same function in system 175 as does push-pull valve 108 in systems 100, namely to transmit a "park" or "lock" signal when actuated. However, push-pull valve 108 exhausts line 136 of system 100 to transmit a park signal when actuated and pressurizes line 136 when deactuated; hand-brake valve 108*a*, on the other hand, operates conversely by pressurizing line 136*a* and exhausting line 136*b* of system 175 when actuated to transmit the park signal and exhausting lines 136*a* and pressurizing line 136*b* when deactuated. Hand-brake valve 108*a*'s operation therefore eliminates the need for inversion valve 110 employed in systems 100 and 150 shown in FIGS. 4–5 and permits direct plumbing between hand-brake valve 108*a* and brake assembly 10 as shown in FIGS. 7–8.

Returning to FIG. 7, System 175 also omits any counterpart for relay valves 116 and 118 shown in systems 100 and 150 of FIGS. 4–5, respectively. Relay valves are normally used in most heavy vehicle braking systems as shown in systems 100 and 150 but are not strictly necessary in all applications. If desired, relays valves can be employed in variations on system 175 as shown in FIG. 8 but this will not be desired in all applications.

System 175*a* shown in FIG. 8 is also adapted from system 175 in FIG. 7 in other ways. As noted above, system 175 can be readily adapted to include four brake assemblies 10 and system 175*a* is one example. System 175*a* also illustrates how system 175 can be adapted to be plumbed to a source of air under pressure including park tank 102 and service tank 104. Park tank 102 and service tank 104 receive air under pressure from compressor 101, sometimes through a wet tank 103, as is well known in the art and feeds air under pressure to park tank 102 and service tank 104 through one-way check valves. With the exception of differences arising from the use of hand-brake valve 108*a* and the elimination of inversion valve 110 discussed above, system 175*a* operates in essentially the same manner as system 100 of FIG. 4 as does system 175 of FIG. 7.

The operation of system 175 shown in FIG. 7 for service and park applications in the preferred embodiment is generally controlled by the operator of the vehicle using treadle valve 106 and hand-brake valve 108*a*. Both treadle valve 106 and hand-brake valve 108*a* are actuatable upon the supply of air under pressure from tanks 102 and 104. Treadle valve 106 receives air under pressure from tank 104 via line 128 while hand-brake valve 108*a* receives air under pressure from tank 102 via line 126.

Although not shown in FIG. 7, plumbing between tanks 102 and 104 and valves 106 and 108*a* can be redundant through two-way check valves as in system 100 of FIG. 4, and so treadle valve 106 and hand-brake valve 108*a* can be supplied from a single source of air under pressure. Furthermore, some embodiments of system 175 can include a compressor and wet tank which may also in those embodiments be considered a part of the source providing air under pressure. Likewise, treadle valve 106 and hand-brake valve 108*a* of system 175*a* in FIG. 8 can be supplied from a single source of air under pressure that may in some embodiments include a compressor and wet tank.

Returning to system 175 of FIG. 7, service applications are initiated when the operator of system 175 depresses the treadle of treadle valve 106. Treadle valve 106 is thereby actuated to transmit a service signal (i.e., air under pressure received via lines 128) via line 131 to each of brake assemblies 10 whereupon each brake assembly 10 then applies its respective brake as discussed above in connection with FIGS. 1–3.

Park applications are initiated when the operator of the vehicle actuates hand-brake valve 108*a* to generate the park signal by first pressuring line 136*a* and then exhausting line 136*b*. Since the parking application requires the brakes of assemblies 10 be locked in an applied position, a service signal must also be generated. Such a service signal is generated in system 175 by the same actuation of hand-brake valve 108*a* that generates the park signal, the service signal being transmitted via line 136*a*. Alternatively, the service signal can be generated by actuating treadle valve 106 at the same time hand-brake valve 108*a* is actuated.

The brake of each brake assembly 10 is then applied as set forth above, locking the brake of brake assembly 10 in an applied position. The brake is unlocked by reapplying air to 136*b* and then exhausting 136*a*. In the event the brake is applied as a result of a service application, the operator simply deactuates treadle valve 106 to exhaust pressure from lines 131 to release the brake.

As noted above, system 175 contains no counterpart to relay valves 116 and 118. System 175 consequently omits lines 120 and 122 between relay valves 116 and 118 and the brake assemblies 10 and lines 132 and 134 between relay valves 116 and 118, respectively, and tanks 102 and 104 found in system 100 of FIG. 4. Also as noted above, the operation of hand-brake valve 108*a* eliminates the need for inversion valve 110 in system 100 of FIG. 4 and in system 150 of FIG. 5. Inversion valve 110 and lines 112, 136, 138, 141–142, and 152 found in system 100 of FIG. 4 consequently have no counterpart in system 175 of FIG. 7.

The addition of relay valves 116 and 118 and accompanying plumbing to system 175 of FIG. 7 may sometimes be desirable is easily accomplished by adapting system 175 as shown in system 175*a* of FIG. 8. Except for the addition of relay valves 116 and 118, operation of system 175*a* is no different from operation of system 175 in FIG. 7 and the plumbing simplification following from the use of hand-brake valve 108*a* and consequent omission of inversion valve 110 is still evident. As with system 100 of FIG. 4 vis-a-vis system 150 in FIG. 5, systems 175 and 175*a* of FIGS. 7–8 can readily be adapted for use with towed rather than powered vehicles in light of the teachings herein.

The preferred embodiment disclosed above is only illustrative and variations thereon are within the scope of the invention claimed below. For instance, although the preferred embodiment is pneumatic, hydraulic embodiments are within the scope of the invention, hence the use of the word "fluid", as opposed to "air", below. Embodiments known as "brake-by-wire," wherein park and service signals are electronic rather than pneumatic or hydraulic, are also within the scope of the invention.

From the foregoing it will be seen that this invention is one well adapted to attain all of the ends and objects previously set forth, together with other advantages which are obvious from the teachings herein and which are inherent to the apparatus. As many possible embodiments may be made of the invention without departing from the scope thereof, it is to be understood that all matter herein set forth or shown in the accompanying drawings is to be interpreted as illustrative and not in a limiting sense. Furthermore, it will be understood that some features and subcombinations are of utility and may be employed without reference to other features and subcombinations. This is contemplated by and is within the scope of the claims.

What is claimed is:

1. A fluid brake system for a vehicle, comprising:

a fluid-applied, mechanically held brake assembly including a housing;

a first rod connectable to a brake;

a first pressure-responsive member within the housing fixed to the first rod to move the first rod in a first direction to apply the brake responsive to the supply of fluid pressure thereto;

first means biasing the first rod in the opposite direction to release the brake responsive to the exhaust of fluid pressure from the first pressure-responsive member;

a second rod fixed to the housing concentrically to the first rod;

a third rod within the housing and arranged concentrically with respect to the first and second rods for reciprocation with respect thereto;

a second pressure-responsive member within the housing and arranged to move the third rod in the first direction responsive to the supply of fluid pressure to the second pressure responsive member;

second means biasing the third rod in the opposite direction responsive to the exhaust of fluid pressure from the second pressure-responsive member;

means for locking the first rod to the second rod when the first rod has been moved in the first direction and the third rod is moved in the opposite direction and for unlocking the first rod from the second rod when the third rod is moved in the first direction;

means in the housing through which fluid under pressure may be supplied to the first pressure-responsive member to move the first rod in the one direction to apply the brake and exhausted from the first pressure-responsive member to permit the first rod to be moved by the first biasing means in the opposite direction to release the brake; and means through which fluid under pressure may be exhausted from the second pressure-responsive member to permit the second biasing means to move the third rod in the opposite direction to lock the brake;

a source of fluid under pressure for supplying fluid under pressure to the first and second pressure responsive members;

first means actuatable to generate and transmit a park signal controlling the delivery and exhaust of fluid under pressure to and from the second pressure responsive member; and second means actuatable to generate and transmit a service signal controlling the delivery and exhaust of fluid under pressure to and from the first pressure responsive member.

2. The fluid brake system of claim 1, wherein:

the first actuatable means is a push-pull valve and the system further includes valving means for delivering and exhausting fluid under pressure upon the exhaust and delivery, respectively, of fluid under pressure by the first actuatable means.

3. The fluid brake system of claim 2, wherein:

the fluid under pressure delivered to and exhausted from the second responsive member is delivered from and exhausted by the valving means.

4. The fluid brake system of claim 2, including means for relaying fluid under pressure from the source to the first pressure-responsive member upon the supply thereto of fluid under pressure from one of the second actuatable means and the valving means.

5. The fluid brake system of claim 2, including means for relaying fluid under pressure from the source to the second pressure responsive member upon the supply thereto of fluid under pressure from one of the first actuatable means and the valving means.

6. The fluid brake system of claim 2, wherein:

the valving means is an inversion valve.

7. The fluid brake system of claim 1, wherein:

the first actuatable means is a hand-brake valve.

8. The fluid brake system of claim 7, including means for relaying fluid under pressure from the source to the first pressure-responsive member upon the supply thereto of fluid under pressure from one of the first actuatable means and the second actuatable means.

9. The fluid brake system of claim 7, including means for relaying fluid under pressure from the source to the second pressure-responsive member upon the supply thereto of fluid under pressure from one of the first actuatable means and the second actuatable means.

10. The fluid brake system of claim 1, wherein:

the second actuatable means is a treadle valve.

11. The fluid brake system of claim 1, wherein the locking means comprises:

expander means on the second rod;

wedging means carried by the third rod for disposal about the expander means so as to be expanded into locking engagement with the hollow first rod as the third rod moves in the opposite direction.

12. The fluid brake system of claim 11, wherein:

the expander means is an inclined face formed on the end of the second rod.

13. The fluid brake system of claim 12, wherein:

the inclined face is a frustoconically shaped surface.

14. The fluid brake system of claim 11, wherein:

the wedging means is a wedge-shaped slip.

15. The fluid brake system of claim 1, wherein the brake assembly of the brake further comprises:

a housing having a first end wall, a second end wall, and an interior wall dividing the housing into first and second compartments intermediate the interior wall and the first and second end walls, respectively;

the first rod extending through the first end wall and the first pressure-responsive member affixed to the first rod to define the first pressure-responsive member in conjunction with the first and interior walls; and the second rod mounted to the interior wall and the second pressure-responsive member operating within the second compartment to define the second pressure-responsive member in conjunction with the second and interior walls.

16. The fluid brake system of claim 1, wherein:

the vehicle is a powered vehicle.

17. The fluid brake system of claim 1, wherein:

the vehicle is a towed vehicle.

18. The fluid brake system of claim 1, wherein:

the first pressure-responsive member is a piston which sealably reciprocates.

19. The fluid brake system of claim 1, wherein:

the second pressure-responsive member is a diaphragm.

20. The fluid brake system of claim 1, including:

means for relaying fluid under pressure from the source to the first pressure-responsive member upon the supply thereto of fluid under pressure; and means for relaying fluid under pressure from the source to the second pressure-responsive member upon the supply thereto of fluid under pressure.

21. The fluid brake system of claim 20, wherein:

at least one of the means for relaying fluid under pressure from the source to the first pressure-responsive member and the means for relaying fluid under pressure from the source to the second pressure-responsive member is a relay valve.

22. The fluid brake system of claim 1, wherein:

the source of fluid under pressure includes a compressor.

23. The fluid brake system of claim 1, wherein:

the source of fluid under pressure includes a reservoir receiving fluid from a compressor.

24. The fluid brake system of claim 1, wherein air may also be supplied to the second pressure-responsive member to compound the force of fluid under pressure in the first pressure-responsive member and overcome the second biasing means in order to move the third rod in the one direction to unlock the brake through the fluid exhaust means.

25. The fluid brake system of claim 1, wherein:

the first actuatable means is actuatable, upon the supply of fluid under pressure from the source, for delivering and exhausting fluid under pressure to deliver and exhaust fluid under pressure to and from the second pressure responsive member.

26. The fluid brake system of claim 1, wherein:

the second actuatable means is actuatable, upon the supply of fluid under pressure from the source, for delivering and exhausting fluid under pressure to deliver and exhaust fluid under pressure to and from the first pressure responsive member.

* * * * *